(12) United States Patent
Abdel-Rehim et al.

(10) Patent No.: US 8,763,564 B2
(45) Date of Patent: Jul. 1, 2014

(54) WATER HEATER AND METHOD OF OPERATING

(75) Inventors: Ayman Abdel-Rehim, Cambridge (CA); Yonghua Cheng, Guelph (CA); Larry N. Chanasyk, Regina (CA)

(73) Assignee: A. O. Smith Corporation, Milwaukee, WI (US)

( * ) Notice: Subject to any disclaimer, the term of this patent is extended or adjusted under 35 U.S.C. 154(b) by 317 days.

(21) Appl. No.: 13/291,467

(22) Filed: Nov. 8, 2011

(65) Prior Publication Data

US 2013/0112155 A1 May 9, 2013

(51) Int. Cl.
*F24H 1/36* (2006.01)

(52) U.S. Cl.
USPC ........................................ 122/18.1; 122/31.2

(58) Field of Classification Search
USPC ............ 122/15.1, 18.1, 18.3, 18.31, 31.1, 64, 122/95.1, 31.2
See application file for complete search history.

(56) References Cited

U.S. PATENT DOCUMENTS

| | | | |
|---|---|---|---|
| 2,147,046 A | 2/1939 | Leoni | |
| 3,612,004 A | 10/1971 | Cancilla et al. | |
| 4,203,392 A | 5/1980 | McLane | |
| 4,222,350 A | 9/1980 | Pompei et al. | |
| 4,641,631 A | 2/1987 | Jatana | |
| 4,651,712 A * | 3/1987 | Davis | 126/110 R |
| 4,658,803 A | 4/1987 | Ball et al. | |
| 4,798,240 A * | 1/1989 | Gerstmann et al. | 165/48.1 |
| 4,938,204 A * | 7/1990 | Adams | 122/18.2 |
| 5,085,579 A | 2/1992 | Moore, Jr. et al. | |
| 5,228,413 A * | 7/1993 | Tam | 122/15.1 |
| 5,372,185 A | 12/1994 | Lannes | |
| 5,485,879 A | 1/1996 | Lannes | |
| 5,636,598 A | 6/1997 | Moore, Jr. | |
| 5,735,237 A | 4/1998 | Phillip et al. | |
| RE37,240 E | 6/2001 | Moore, Jr. et al. | |
| 6,283,067 B1 | 9/2001 | Akkala | |
| 6,672,258 B2 | 1/2004 | Hayashida et al. | |
| 6,681,723 B1 | 1/2004 | Amendt et al. | |
| 6,790,481 B2 | 9/2004 | Bishop et al. | |
| 7,122,149 B2 | 10/2006 | Li et al. | |
| 7,258,080 B2 | 8/2007 | Missoum et al. | |
| 7,553,460 B2 | 6/2009 | Stell et al. | |
| 7,669,644 B2 | 3/2010 | Alessandrini et al. | |
| 7,836,856 B2 | 11/2010 | Mullen et al. | |
| 8,161,918 B2 * | 4/2012 | Ma et al. | 122/15.1 |
| 2008/0197205 A1 | 8/2008 | Ene et al. | |
| 2010/0043728 A1 | 2/2010 | Ma et al. | |
| 2010/0275907 A1 | 11/2010 | Mantelatto | |

FOREIGN PATENT DOCUMENTS

JP 2008241168 10/2008

* cited by examiner

*Primary Examiner* — Gregory A Wilson
(74) *Attorney, Agent, or Firm* — Michael Best & Friedrich LLP

(57) ABSTRACT

A water heater includes a storage tank for storing water, a combustion chamber, a burner positioned in the combustion chamber, and a heat exchanger positioned in the storage tank. The burner produces products of combustion. The heat exchanger receives the products of combustion from the combustion chamber and transfers heat from the products of combustion to the water stored in the storage tank. The heat exchanger includes an upper portion and a lower portion. The upper portion is positioned above the combustion chamber and the lower portion is positioned below the combustion chamber.

36 Claims, 4 Drawing Sheets

WATER HEATER AND METHOD OF OPERATING

BACKGROUND OF THE INVENTION

The present invention relates to water heaters, and more particularly to condensing water heaters.

SUMMARY OF THE INVENTION

The present invention provides, in one aspect, a water heater including a storage tank for storing water, a combustion chamber, a burner positioned in the combustion chamber, and a heat exchanger positioned in the storage tank. The burner produces products of combustion. The heat exchanger receives the products of combustion from the combustion chamber and transfers heat from the products of combustion to the water stored in the storage tank. The heat exchanger includes an upper portion and a lower portion. The upper portion is positioned above the combustion chamber and the lower portion is positioned below the combustion chamber.

The present invention provides, in another aspect, a water heater including a storage tank for storing water, a combustion chamber, a burner positioned in the combustion chamber, and a heat exchanger positioned in the storage tank. The burner produces products of combustion. The heat exchanger receives the products of combustion from the combustion chamber and transfers heat from the products of combustion to the water stored in the storage tank. The heat exchanger includes an upper portion with multiple upper coils spaced apart from one another at an upper coil pitch and a lower portion with multiple lower coils spaced apart from one another at a lower coil pitch. The lower coil pitch is different than the upper coil pitch.

The present invention provides, in another aspect a method of operating a water heater including a storage tank containing water, a combustion chamber, and a burner positioned in the combustion chamber. The method includes the steps of producing products of combustion with the burner, conducting the products of combustion through the storage tank and above the combustion chamber to heat the water and not allowing the products of combustion to condense, and conducting the products of combustion through the storage tank and below the combustion chamber to heat the water and allowing the products of combustion to condense.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
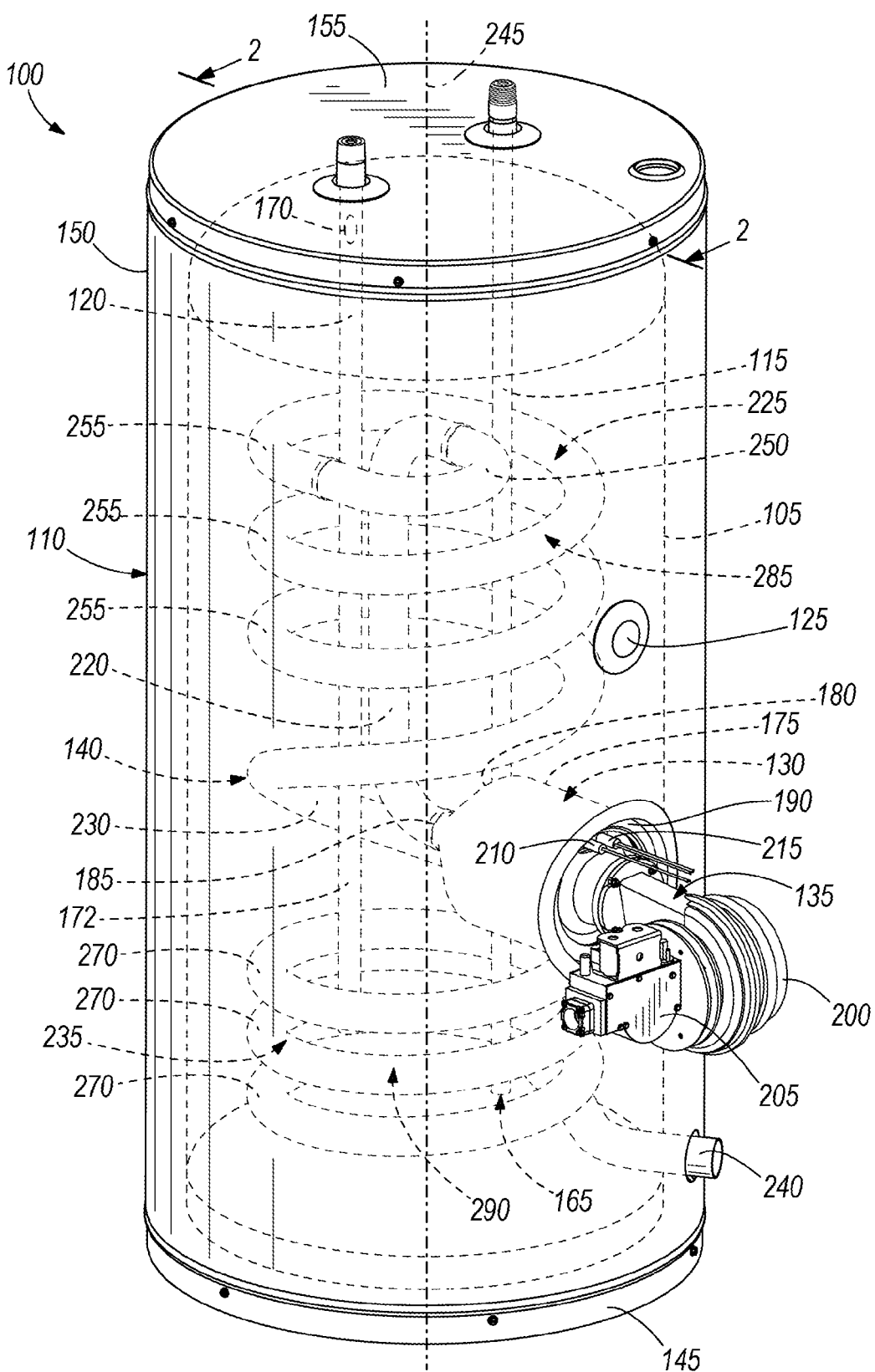
FIG. 1 is a perspective view of a water heater with internal components shown in dashed lines.
Figure 2:
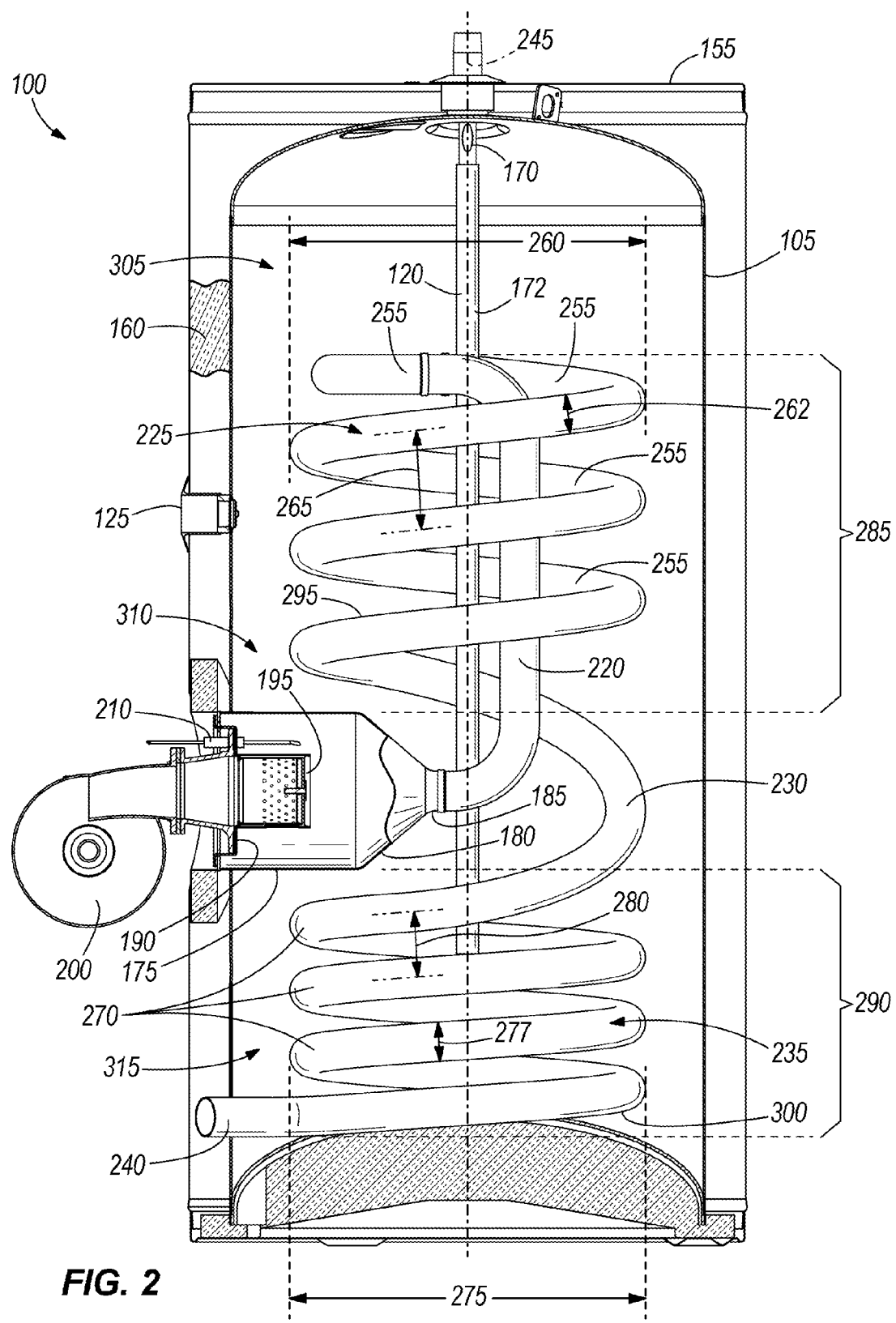
FIG. 2 is a section view of the water heater of FIG. 1 along line 2-2.

FIGS. 1 and 2 illustrate a water heater 100. The water heater 100 includes a storage tank 105, an outer case 110, a cold water dip tube 115, a hot water pipe 120, a water temperature sensor 125, a combustion chamber 130, a burner assembly 135, and a flue or heat exchanger 140. The water heater 100 may also include additional conventional components of a gas-fired storage water heater, for example, a temperature and pressure (T&P) valve, a sacrificial anode, and a drain valve.

For the purposes of the present specification, all spatial and directional terms shall, unless specifically stated otherwise, refer to space and direction relative to the normal operating position of the water heater 100 as shown in FIGS. 1 and 2. The term "above" shall mean intersecting a comparatively higher horizontal plane, and the term "directly above" shall mean intersecting a comparatively higher horizontal plane and intersecting a common vertical line. The term "below" shall mean intersecting a comparatively lower horizontal plane, and the term "directly below" shall mean intersecting a comparatively lower horizontal plane and intersecting a common vertical line.

As shown in FIGS. 1 and 2, the outer case 110 includes a base 145, a jacket 150, a cover 155, and insulation 160. The storage tank 105 is seated on top of the base 145. The jacket 150 surrounds the storage tank 105. The lower end of the jacket 150 is coupled to the base 145. As illustrated, the jacket 150 is cylindrical. The cover 155 is positioned above the storage tank 105 and is coupled to the upper end of the jacket 150. As shown in FIG. 2, insulation 160 is provided in the space between the storage tank 105 and the jacket 150. Insulation 160 can also be provided between the base 145 and the storage tank 105 and between the cover 155 and the storage tank 105.

As shown in FIGS. 1 and 2, the cold water dip tube 115 and the hot water pipe 120 each extend through the cover 155 and into the storage tank 105. The cold water dip tube 115 extends further into the storage tank 105 than the hot water pipe 120. As shown in FIG. 1, the cold water dip tube 115 includes an outlet 165 that is positioned near the bottom of the storage tank 105. The cold water dip tube 115 supplies water to the storage tank 105 through the outlet 165. As shown in FIGS. 1 and 2, the hot water pipe 120 includes an inlet 170 that is positioned near the top of the storage tank 105. The hot water pipe 120 also includes an anode 172. Hot water is drawn through the inlet 170 into the hot water pipe 120 to supply hot water from the storage tank 105 to an end-use location, for example, a faucet.

As shown in FIGS. 1 and 2, the water temperature sensor 125 is coupled to the jacket 150 and extends through jacket 150 and into the storage tank 105. The water temperature sensor 125 is positioned above the combustion chamber 130. The water temperature sensor 125 is configured to detect the temperature of the water at or near the sensor 125.

Figure 3:
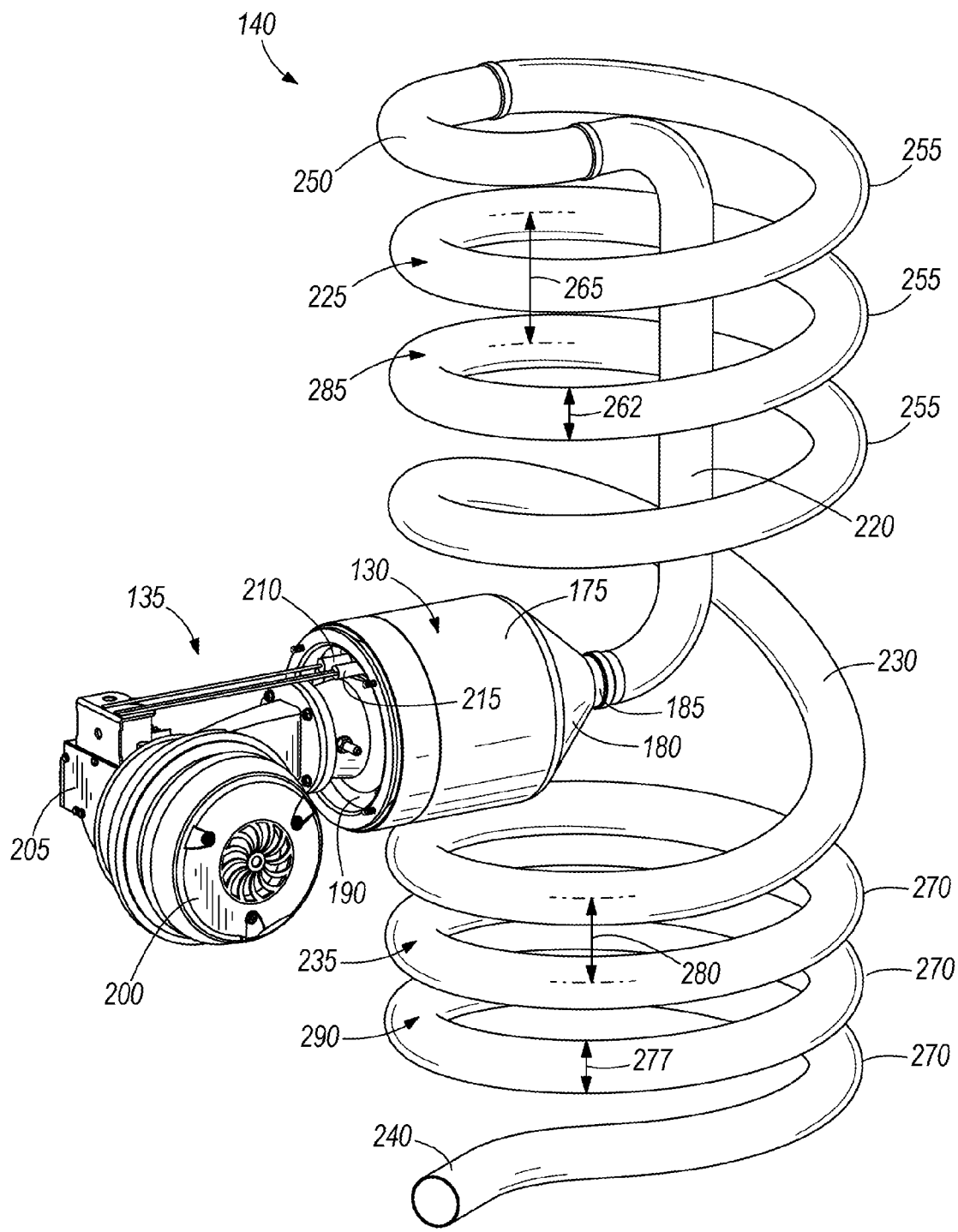
FIG. 3 is a perspective view of a portion of the water heater of FIG. 1.

As shown in FIG. 3, the combustion chamber 130 includes a cylindrical section 175, a frustoconical section 180, and an outlet section 185. The combustion chamber 130 is secured to the storage tank 105 and extends into the storage tank 105. As illustrated, the majority of the combustion chamber 130 extends into the storage tank 105. This helps to reduce the overall size of the water heater 100. The frustoconical section 180 extends from the inner end of the cylindrical section 175. The outer end of the cylindrical section 175 is open to receive at least a portion of the burner assembly 135. The frustoconical section 180 narrows from a wide end to a narrow end. The outlet section 185 is located at the narrow end of the frustoconical section 180.

As shown in FIGS. 1-4, the burner assembly 135 includes a mount 190, a burner 195, a blower 200, a gas valve 205, an igniter 210, and a flame sensor 215. The mount 190 supports the burner 195. As shown in FIG. 2, the mount 190 is secured at the open end of the cylindrical section 175 of the combustion chamber 130 such that the burner 195 is positioned in the combustion chamber 130. The blower 200 is coupled to the burner 195 and the gas valve 205 is coupled to the blower 200 such that a fuel/air mixture is supplied by the blower 200 and the gas valve 205 to the burner 195 for combustion by the burner 195. The combustion of the fuel/air mixture by the burner 195 produces hot products of combustion within the combustion chamber 130. As shown in FIGS. 1-4, the mount 190 also supports the igniter 210 and the flame sensor 215 such that the igniter 210 and the flame sensor 215 extend into the combustion chamber 130 to a location near the burner 195. The igniter 210 is used to ignite the fuel/air mixture at the burner 195 to begin combustion of the fuel/air mixture. The flame sensor 215 is used to detect the flame produced by the burner 195 and thereby ensure that combustion is taking place. In some embodiments, the burner 195 has an input of 40,000 BTU/HR (11.72 kilowatts) to 75,000 BTU/HR (21.97 kilowatts).

As shown in FIGS. 1-4, the heat exchanger 140 includes an inlet section 220, an upper section 225, a transition section 230, a lower section 235, and an outlet section 240. A vertical axis 245 passes through the center of the heat exchanger 140. The heat exchanger 140 conducts the products of combustion from the combustion chamber 130 through the water in the storage tank 105 so that heat is transferred from the products of combustion to the water. The inlet section 220 of the heat exchanger 140 is connected to the outlet section 185 of the combustion chamber 130 so that the combustion chamber 130 and the heat exchanger 140 are in fluid communication with one another. The inlet section 220 conducts the products of combustion upward above the combustion chamber 130 to the top of the upper section 225 of the heat exchanger 140.

Figure 4:
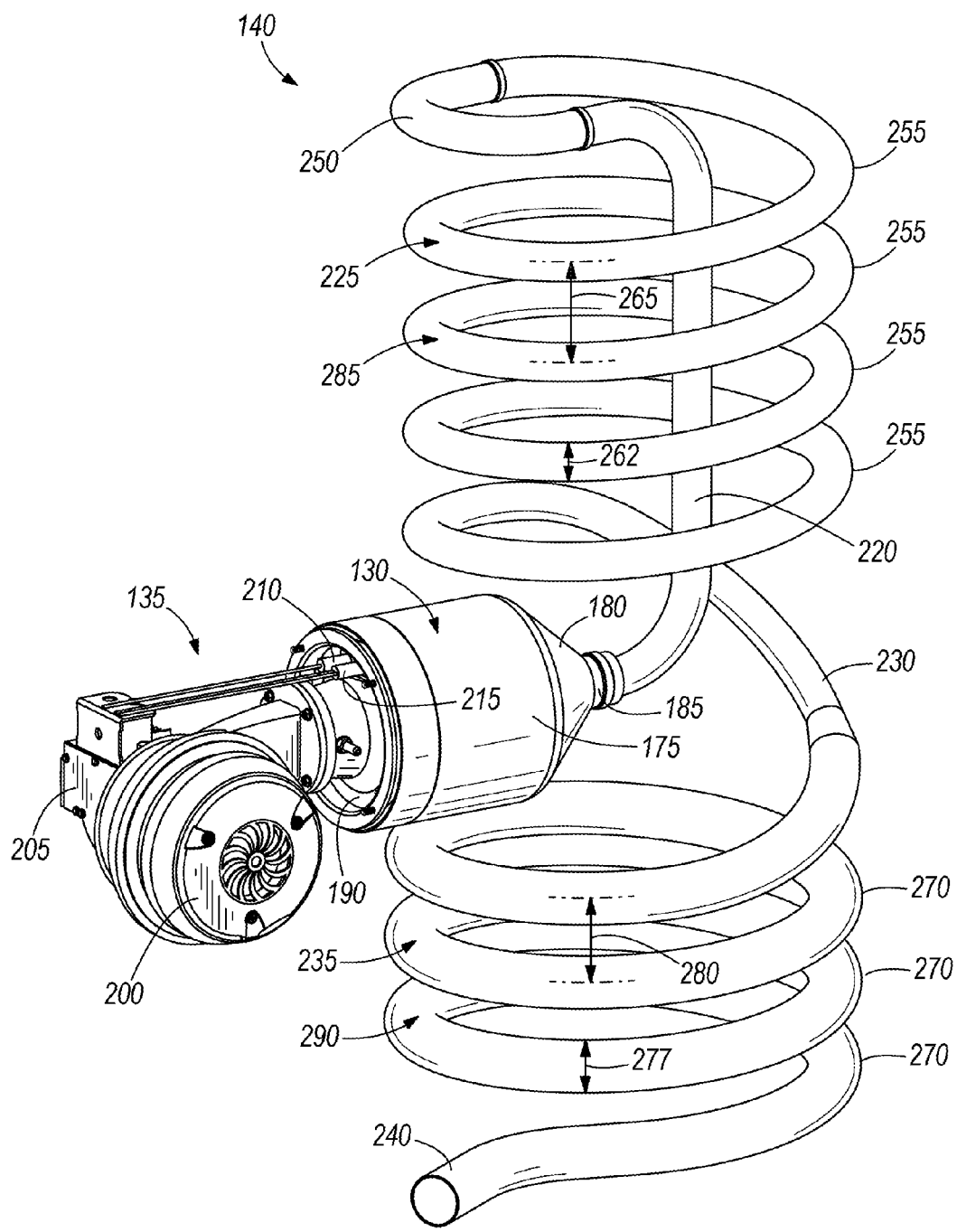
FIG. 4 is a perspective view of a portion of an alternate water heater.

As shown in FIGS. 1-4, the upper section 225 includes a connector 250 and multiple upper coils 255. The connector 250 is substantially U-shaped and connects the inlet section 220 with the uppermost upper coil 255. The upper coils 255 are helical and have an upper coil diameter 260 (shown in FIG. 2) and an upper tube diameter 262. The coil diameter is the diameter of the coil itself and the tube diameter is the diameter of the tube that forms the coil. The products of combustion are conducted downward through the upper coils 255 to the transition section 230. At least a portion of the inlet section 220 is positioned inside the upper coils 255. As shown in FIGS. 2-4, the upper coils 255 are spaced apart from one another at an upper coil pitch 265. Coil pitch is the vertical distance between two adjacent coils measured between a first point located at the center of the first coil and a second point located at the center of the second coil and directly below the first point. In some embodiments, the upper coil pitch 265 is between 2.5 inches (6.4 centimeters) and 3.8 inches (9.7 centimeters). The number of upper coils 255 can vary, as shown in FIGS. 3-4. In some embodiments, the upper tube diameter 262 is between 1.0 inches (2.5 centimeters) and 2.0 inches (5.1 centimeters).

As shown in FIGS. 1-4, the transition section 230 connects the upper section 225 to the lower section 235. The transition section 230 is formed as a coil or portion of a coil with a greater coil pitch that permits the combustion chamber 130 to be positioned between the upper section 225 and the lower section 235 without the combustion chamber 130 contacting the transition section 230, the upper section 225, or the lower section 235.

As shown in FIGS. 1-4, the lower section 235 includes multiple lower coils 270. The lower coils 270 are helical and have a lower coil diameter 275 (shown in FIG. 2) and a lower tube diameter 277. The products of combustion are conducted downward through the lower coils 270 to the outlet section 240. As shown in FIGS. 2-4, the lower coils 270 are spaced apart from one another at a lower coil pitch 280. The lower coil pitch 280 is different than the upper coil pitch 265. As illustrated in FIGS. 1-4, the upper coil pitch 265 is greater than the lower coil pitch 280. In one embodiment, the lower coil pitch 280 is 2.5 inches (6.4 centimeters). The number of lower coils 270 can vary. As shown in FIG. 4, the number of upper coils 255 is greater than the number of lower coils 270. As shown in FIG. 2, the upper coil diameter 260 is equal to the lower coil diameter 275. In some embodiments, the upper coil diameter 260 is not equal to the lower coil diameter 275. As shown in FIG. 3, the upper tube diameter 262 is equal to the lower tube diameter 277. As shown in FIG. 4, the upper tube diameter 262 is less than the lower tube diameter 277. In some embodiments, the lower tube diameter 277 is between 1.0 inches (2.5 centimeters) and 2.0 inches (5.1 centimeters).

As shown in FIGS. 1-4, the lowermost lower coil 270 is connected to the outlet section 240. The outlet section 240 extends from the storage tank 105 through the outer case 110. The outlet section 240 is typically connected to an exhaust system that is, in turn, connected to atmosphere.

As shown in FIGS. 1-4, the heat exchanger 140 can also be divided into an upper portion 285 and a lower portion 290. As best shown in FIG. 2, any part of the heat exchanger 140 located above the uppermost part of the combustion chamber 130 is considered to be located in the upper portion 285 and any part of the heat exchanger 140 located below the lowermost part of the combustion chamber 130 is considered to be located in the lower portion 290. The upper portion 285 has an upper heat transfer surface area 295 that is the total surface area of the upper portion 285 that is in a heat-exchange relationship with the water in the storage tank 105. The lower portion 290 has a lower heat transfer surface area 300 that is the total surface area of the lower portion 290 that is in a heat-exchange relationship with the water in the storage tank 105. In one embodiment, the upper heat transfer surface area 295 is greater than the lower heat transfer surface area 300.

With reference to FIG. 2, in use, the products of combustion produced by the burner 195 are conducted by the heat exchanger 140 through the storage tank 105 and above the combustion chamber 130 to heat the water in the storage tank 105. The products of combustion are not allowed to condense when they are above the combustion chamber 130. The products of combustion are then conducted by the heat exchanger 140 below the combustion chamber 130 to heat the water in the storage tank 105. Not allowing condensation until the products of combustion are below the combustion chamber 130 helps to prevent condensation from forming within the combustion chamber 130. The products of combustion are allowed to condense when they are below the combustion chamber 130. Allowing the products of combustion to condense increases the efficiency of the water heater 100 by transferring the latent heat energy associated with the condensation of the products of combustion to the water. In this way, more of the heat energy produced by the burner 195 is transferred to the water in the storage tank 105 to allow the water heater 100 to achieve a thermal efficiency greater than 90%.

As shown in FIG. 2, conducting the products of combustion through the heat exchanger 140 in this manner creates multiple temperature zones in the water. The temperature zones include a hot water zone 305, a warm water zone 310, and a cold water zone 315. The hot water zone 305 is located near the top of the storage tank 105, the warm water zone 310 is located between the hot water zone 305 and the cold water zone 315, and the cold water zone 315 is located near the bottom of the storage tank 105. Preferably, the outlet 165 of the cold water dip tube 115 is located in the cold water zone 315 and the inlet 170 of the hot water pipe 120 is located in the hot water zone 305.

The amount of hot water in the hot water zone 305 is linked to the first-hour rating (FHR) and the dump load capability of the water heater 100. The first hour rating is the amount of hot water in gallons the heater can supply per hour (starting with a tank full of hot water). The water heater 100 achieves a high usable hot water capacity, preferably with a first-hour rating of at least sixty-seven gallons per hour.

The combustion chamber 130 is positioned in the warm water zone 310 so that the products of combustion within the combustion chamber 130 do not condense. Condensation in the combustion chamber 130 is not desirable because the condensation can corrode the combustion chamber 130 and burner 195, adversely affect the flame, and cause other problems. By positioning the combustion chamber 130 in the warm water zone 310, the temperature of the products of combustion in the combustion chamber 130 is kept above the dew point and condensation of the products of combustion does not occur in the combustion chamber 130.

The amount of cold water in the cold water zone 315 is linked to the efficiency of the water heater 100. Efficiency is increased by increasing the amount of condensation of the products of combustion that occurs within the heat exchanger 140. One measure of efficiency is energy factor (EF). The energy factor (EF) indicates a water heater's overall energy efficiency based on the amount of hot water produced per unit of fuel consumed over a typical day. The overall efficiency includes recovery efficiency—how efficiently the heat from the energy source is transferred to the water, standby losses— the percentage of heat loss per hour from the stored water compared to the heat content of the water, and cycling losses—the loss of heat as the water circulates through a water heater tank, and/or inlet and outlet pipes. By allowing the products of combustion to condense in the lower portion 290 of the heat exchanger 140 located in the cold water zone 315, the recovery efficiency is increased by transferring the energy associated with condensation to the water. Within the cold water zone 315, the temperature of the products of combustion will drop below the dew point and condensation will occur. If a portion of the combustion chamber 130 were to be located in the cold water zone 315, condensation of the products of combustion would occur within the combustion chamber 130. As explained above, condensation of the products of combustion within the combustion chamber 130 is not desired. Therefore, the combustion chamber 130 is preferably located above the cold water zone 315. Preferably, the water heater 100 achieves an energy factor of at least 0.82. In some embodiments, the water heater 100 achieves an energy factor of at least 0.8. Another measure of efficiency is thermal efficiency, which compares the energy output to the energy input. In some embodiments, the water heater 100 achieves a thermal efficiency of 98.5%

Preferably, the amount of water in the storage tank 105 is distributed among the three temperature zones such that about a third of the volume of the water is in the hot water zone 305, about a third of the volume of the water is in the warm water zone 310, and about a third of the volume of the water is in the cold water zone 315. This distribution provides a combination of first-hour rating and energy factor that is acceptable to the consumer and avoids condensation of the products of combustion within the combustion chamber 130. It is difficult to achieve both a first-hour rating and an energy factor that are acceptable to consumer. Increasing the first-hour rating can lead to a reduced energy factor and vice versa. First-hour rating is important to consumers for user comfort and thermal efficiency and energy factor are important to consumers to reduce the energy costs to operate the water heater 100 and for obtaining U.S. federal income tax credits. Changing the construction of the upper portion 285 of the heat exchanger 140 and the lower portion 290 of the heat exchanger 140 relative to one another changes the amount of heat transfer between the products of combustion in the upper portion 285 and the water in the storage tank 105 and changes the amount of heat transfer between the products of combustion in the lower portion 290 and the water in the storage tank 105. These changes in the construction of the heat exchanger 140 create related changes in the size of the three temperature zones 305, 310, and 315. Increasing the size of the hot water zone 305 increases the first-hour rating and the dump load capability. Increasing the size of the cold water zone 315 can increase the recovery efficiency, the energy factor, and the thermal efficiency. By making changes to the construction of the upper portion 285 of the heat exchanger 140 and the lower portion 290 of the heat exchanger 140, the water heater 100 can be configured to maximize first-hour rating and dump load capability or to maximize energy factor and thermal efficiency. Possible changes in the construction of the heat exchanger 140 to adjust the relative size of the three temperature zones 305, 310, and 315 include changing the upper heat transfer surface area 295 and the lower heat transfer surface area 300, changing the upper coil pitch 265 and the lower coil pitch 280, changing the number of the upper coils 255 and the number of the lower coils 270, changing the upper coil diameter 260 and the lower coil diameter 275, and changing the upper tube diameter 262 and changing the lower tube diameter 277. These changes can be made singly or in combination. FIG. 3 illustrates a heat exchanger 140 with the upper coil diameter 260 equal to the lower coil diameter 275, the upper tube diameter 262 equal to the lower tube diameter 277, and the upper coil pitch 265 greater than the lower coil pitch 280. FIG. 4 illustrates a heat exchanger 140 with the upper coil diameter 260 equal to the lower coil diameter 275, the upper tube diameter 262 less than the lower tube diameter 277, the upper coil pitch 265 greater than the lower coil pitch 280, and the number of upper coils 255 greater than the number of lower coils 270.

Various features of the invention are set forth in the following claims.

What is claimed is:

1. A water heater comprising
a storage tank for storing water;
a combustion chamber;
a burner positioned in the combustion chamber, the burner for producing products of combustion; and
a heat exchanger positioned in the storage tank for receiving the products of combustion from the combustion chamber and for transferring heat from the products of combustion to the water stored in the storage tank, the heat exchanger including an upper portion and a lower portion, the upper portion positioned above the combustion chamber and the lower portion positioned below the combustion chamber; wherein the upper portion includes a plurality of upper coils having an upper coil diameter; and wherein the lower portion includes a plurality of lower coils having a lower coil diameter, the lower coil diameter different than the upper coil diameter.

2. The water heater of claim 1 wherein the plurality of upper coils are spaced apart from one another at an upper coil pitch; and wherein the plurality of lower coils are spaced apart from one another at a lower coil pitch, the lower coil pitch different than the upper coil pitch.

3. The water heater of claim 2 wherein the lower coil pitch is less than the upper coil pitch.

4. The water heater of claim 1 wherein the number of upper coils is different than the number of lower coils.

5. The water heater of claim 4 wherein the number of upper coils is greater than the number of lower coils.

6. The water heater of claim 1 wherein the lower coil diameter is greater than the upper coil diameter.

7. The water heater of claim 1 wherein the plurality of upper coils have an upper tube diameter; and wherein the plurality of lower coils have a lower tube diameter, the lower tube diameter different than the upper tube diameter.

8. The water heater of claim 7 wherein the lower tube diameter is greater than the upper tube diameter.

9. The water heater of claim 1 wherein the upper portion has an upper heat transfer surface area and the lower portion has a lower heat transfer surface area less than the upper heat transfer surface area.

10. The water heater of claim 1 wherein at least a portion of the combustion chamber extends into the storage tank.

11. A water heater comprising:
a storage tank for storing water;
a combustion chamber;
a burner positioned in the combustion chamber, the burner for producing products of combustion; and
a heat exchanger positioned in the storage tank for receiving the products of combustion from the combustion chamber and for transferring heat from the products of combustion to the water stored in the storage tank, the heat exchanger including an upper portion with a plurality of upper coils spaced apart from one another at an upper coil pitch and a lower portion with a plurality of lower coils spaced apart from one another at a lower coil pitch, the lower coil pitch different than the upper coil pitch.

12. The water heater of claim 11 wherein the lower coil pitch is less than the upper coil pitch.

13. The water heater of claim 11 wherein the number of upper coils is greater than the number of lower coils.

14. The water heater of claim 11 wherein the upper portion has an upper heat transfer surface area and the lower portion has a lower heat transfer surface area less than the upper heat transfer surface area.

15. The water heater of claim 11 wherein the upper coils have an upper coil diameter; and wherein the lower coils have a lower coil diameter, the lower coil diameter greater than the upper coil diameter.

16. A method of operating a water heater including a storage tank containing water, a combustion chamber, and a burner positioned in the combustion chamber, the method comprising:
producing products of combustion with the burner;
conducting the products of combustion through the storage tank and above the combustion chamber to heat the water and not allowing the products of combustion to condense; and
conducting the products of combustion through the storage tank and below the combustion chamber to heat the water and allowing the products of combustion to condense.

17. The method of claim 16 further comprising:
not allowing the products of combustion in the combustion chamber to condense.

18. The method of claim 16 further comprising:
positioning the combustion chamber at least partially within the tank at a location such that the products of combustion in the combustion chamber are not allowed to condense.

19. The method of claim 16 wherein the products of combustion are first conducted above the combustion chamber and then conducted below the combustion chamber.

20. The method of claim 19 further comprising:
not allowing the products of combustion in the combustion chamber to condense.

21. The method of claim 19 further comprising:
positioning the combustion chamber at least partially within the tank at a location such that the products of combustion in the combustion chamber are not allowed to condense.

22. The method of claim 16 further comprising:
achieving an energy factor (EF) of at least 0.8.

23. The method of claim 22 further comprising:
achieving a first-hour rating (FHR) of at least sixty-seven gallons per hour.

24. The method of claim 16 further comprising:
achieving an energy factor (EF) of at least 0.82.

25. The method of claim 24 further comprising:
achieving a first-hour rating (FHR) of at least sixty-seven gallons per hour.

26. The method of claim 16 further comprising:
achieving a first-hour rating (FHR) of at least sixty-seven gallons per hour.

27. The method of claim 16 further comprising:
conducting the products of combustion through the storage tank to maximize first-hour rating (FHR).

28. The method of claim 16 further comprising:
conducting the products of combustion through the storage tank to maximize energy factor (EF).

29. A water heater comprising
a storage tank for storing water;
a combustion chamber;
a burner positioned in the combustion chamber, the burner for producing products of combustion; and
a heat exchanger positioned in the storage tank for receiving the products of combustion from the combustion chamber and for transferring heat from the products of combustion to the water stored in the storage tank, the heat exchanger including an upper portion and a lower portion, the upper portion positioned above the combustion chamber and the lower portion positioned below the combustion chamber; wherein the upper portion includes a plurality of upper coils having an upper tube diameter; and wherein the lower portion includes a plurality of lower coils having a lower tube diameter, the lower tube diameter different than the upper tube diameter.

30. The water heater of claim 29, wherein the lower tube diameter is greater than the upper tube diameter.

31. The water heater of claim 29, wherein the upper portion has an upper heat transfer surface area and the lower portion has a lower heat transfer surface area less than the upper heat transfer surface area.

32. The water heater of claim 29, wherein at least a portion of the combustion chamber extends into the storage tank.

33. The water heater of claim 29, wherein the plurality of upper coils are spaced apart from one another at an upper coil pitch; and wherein the plurality of lower coils are spaced apart from one another at a lower coil pitch, the lower coil pitch different than the upper coil pitch.

34. The water heater of claim 33, wherein the lower coil pitch is less than the upper coil pitch.

35. The water heater of claim 29, wherein the number of upper coils is different than the number of lower coils.

36. The water heater of claim 35, wherein the number of upper coils is greater than the number of lower coils.

\* \* \* \* \*